June 11, 1935.   F. A. KUHN   2,004,489

TELESCOPE SIGHT MOUNTING

Filed Oct. 18, 1932

INVENTOR
Frederick A. Kuhn
BY
James S. Stewart
ATTORNEY

Patented June 11, 1935

2,004,489

UNITED STATES PATENT OFFICE 2,004,489

TELESCOPE SIGHT MOUNTING

Frederick A. Kuhn, Meriden, Conn., assignor to
The Lyman Gun Sight Corp., Middlefield,
Conn., a corporation of Connecticut Application October 18, 1932, Serial No. 638,307

14 Claims.  (Cl. 33—50)

My invention relates to a telescope sight mounting and more especially to a mounting in which a telescope sight may be supported and accurately adjusted either vertically or laterally.

Telescope sight mountings of the character contemplated generally comprise a frame, adapted to be detachably secured on a rifle barrel or the like and having an opening in which the telescope is received, and radially positioned adjusting screws against the inner ends of which the telescope is pressed by one or more spring pressed abutments. Two adjusting screws are usually provided one of which is vertically positioned and controls the elevation of the telescope while the other is horizontally arranged and controls windage adjustments. Graduated thimbles are usually mounted on the screws so that the latter may be closely adjusted. The present invention relates in many aspects to a mounting of the above character and in the preferred embodiment, hereinafter described, is provided with both elevation and windage screws having graduated thimbles.

One of the objects of the invention is to provide an adjusting screw having a graduated thimble or the like together with a mechanism for producing an audible click, which may also be felt, as each graduation on the thimble comes into registration with a reference line on the mount, the mechanism being such that adjustments may be made without visual inspection.

A further object of the invention is to provide a mount of the above character in which the click mechanism is protected against the entrance of dirt and the chance of accidental injury.

A still further object of the invention is to provide a click mount in which the click mechanism has no tendency to throw strains on the screw and the threaded opening in which the screw is mounted or otherwise affect adversely the adjustment of the telescope in the mount.

Another object of the invention is to provide a mount having a graduated thimble or the like which may be readily adjusted with respect to the screw so as to bring any desired portion of the scale on the thimble into registration with a reference line on the body or other suitable part of the mount.

To these and other ends, the invention consists in the novel features and combination of parts to be hereinafter described and claimed.

Figure 2:
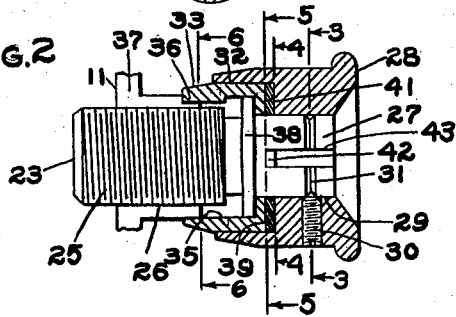
Fig. 2 is a longitudinal sectional view, on an enlarged scale, of the adjusting means used for moving the sight for elevation and windage adjustments.
Figure 3:
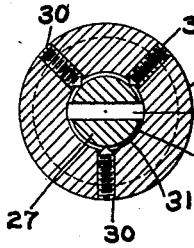
Figure 4:
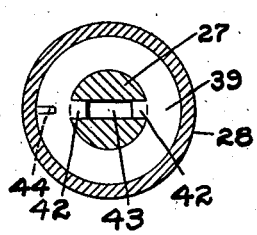
Figure 5:
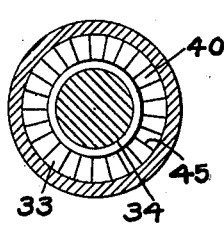
Figure 6:
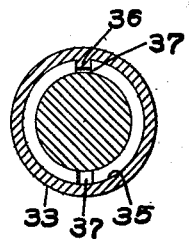
Figure 7:
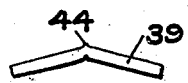

Fig. 3 is a section along line 3—3 of Fig. 2;
Fig. 4 is a section along line 4—4 of Fig. 2;
Fig. 5 is a section along line 5—5 of Fig. 2;
Fig. 6 is a section along line 6—6 of Fig. 2; and
Fig. 7 is an elevational view of a part of the telescope sight mounting.

Figure 1:
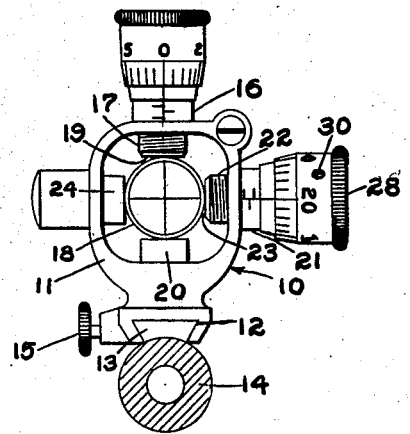
Fig. 1 is an elevational view of a telescope sight mounting embodying the invention.

Referring now to the drawing, in which I have illustrated my invention by showing a preferred embodiment of the same, the reference numeral 10 indicates, in general, a telescope sight mounting, or rear mount, which in this instance takes the form of a body or frame 11, having in the lower end thereof a dove-tail slot 12, in which a dove-tail 13, on barrel 14 is received, frame 11 being secured to dove-tail 13 by means of thumb-screw 15. On the upper end of frame 11 is a boss 16, in which elevation screw 17 is mounted, telescope 18 being pressed against the inner end 19, of screw 17, by means of spring pressed abutment 20, not shown herein in detail. On the right hand side of frame 11, as viewed in Fig. 1, is a boss 21 in which windage screw 22 is mounted, telescope 18 being pressed against the inner end 23, of screw 22, by means of spring pressed abutment 24. Spring pressed abutments are well known in telescope sight mounts and it will be unnecessary to show or describe these herein.

The windage screw 22 is threaded at 25, for reception in the threaded opening 26, of boss 21, and is reduced at its outer end 27, for the reception of thimble 28, which in turn is provided at its outer end with an opening 29 closely fitting the reduced end 27 of the screw, the thimble being normally held against rotational and endwise movement, on screw 22, by means of set screws 30, mounted in thimble 28 and seated in groove 31, extending around the end of screw 22.

Thimble 28 is counterbored at 32 for the reception of sleeve 33, over which the counterbored end of the thimble telescopes, sleeve 33 having an opening 34 at one end, closely fitting the reduced end 27 of screw 22, and being counterbored at its opposite end, as at 35, to permit the reception of boss 21 therein, the sleeve telescoping over the boss. Rotational movement of sleeve 33 is prevented by an internal lug 36, formed on the end of the sleeve the lug riding in an axially directed slot 37 in boss 21. Endwise movement of sleeve 33 on screw 22, in one direction, is prevented by radial flange 38 on screw 22, the flange being seated at the bottom of counterbore 35, while endwise movement of sleeve 33, in the opposite direction, is prevented by click spring 39 mounted between the end face 40 of sleeve 33 and the face 41, at the bottom of counterbore 32.

Click spring 39 is of washer like shape, is preferably made of fairly thin spring steel, is provided with a tongue 42, received in axial slot 43 in the end 27 of screw 22, and an indentation or rib 44 which bears against the end face 40 of sleeve 33. The end face 40 is provided with a number of radial grooves or recesses 45, corresponding in number to the graduations 46 on thimble 28, into which the rib 44 passes as the thimble is rotated to form the clicks. It will be noted, from Fig. 7, that the indentation or rib 44 protrudes a considerable amount before the spring is assembled in the mount, the spring being flattened between the faces 40 and 41 of the sleeve and thimble respectively. The tension in the spring causes the rib 44 to enter each groove with a distinct click, movement of the rib out of the respective grooves requiring some additional pressure on the thimble. In the present instance the thimble is provided with 25 divisions set off in units of five, the reference line being partly on the sleeve and partly on the boss. The graduations on the boss represent complete turns of the thimble, each division thus representing 25 divisions on the thimble.

The construction of the elevation screw is much the same as the windage screw just described and will therefore not be described herein in detail. The operation of the mount is as follows:

When the mount is assembled on a rifle or other firearm with the rear end of the telescope sight supported therein (the front end of the telescope being supported in any usual form of front mount), the screw 17 may be adjusted to bring the telescope into proper elevation for the range contemplated, while the windage screw 22 may be adjusted to make such lateral correction as may be necessary, according to wind or other conditions present. If there is no wind blowing, or conditions are otherwise suitable for zeroing the sight, the windage screw may be adjusted until there is no lateral deviation, of the point of impact, from the center of the target. After such adjustment the graduations on thimble 28 will generally have an arbitrary setting with respect to the reference line on the sleeve and boss. The screws 30 may be slightly loosened and the thimble rotated on the screw 22, while the latter remains stationary, to bring the graduation marked 0 on the thimble into alignment with the reference line. Furthermore the outer end of the sleeve 33 acts as a reference line in reading the graduations on the boss 21 and it often happens that the usual sleeve or thimble edge is not in alignment with any of the marks on the boss, when the graduations on the thimble read 0 with respect to the reference line on the boss. With the present construction this may be corrected by rotating the screw to bring the end of the sleeve 33 into alignment with one of the graduations on the boss and then loosening the screws 30 and rotating the thimble to bring the 0 graduation thereon into alignment with the reference line on the sleeve 33.

The click mechanism is such that elevation and windage adjustments may be rapidly and accurately made without the necessity of visual examination simply by counting or feeling the number of clicks, a feature which renders it unnecessary for the shooter to get out of position. It will be readily seen that the click mechanism is mounted entirely within the thimble with no parts exposed so that there is no opportunity for dirt to enter this mechanism and very little chance for the mechanism to be accidently injured. Furthermore the click mechanism is entirely supported on the screw and its construction is such that no relative strain between the screw and body can occur.

While I have shown and described a preferred embodiment of my invention, it is to be understood that the same is not to be limited to all the details shown but is capable of modification and variation within the spirit of the invention and the scope of the appended claims.

What I claim is:

1. A mounting for telescope sights comprising a frame, a boss on said frame, a sleeve telescoped over said boss, means for limiting the movement of the sleeve on the boss to a direction axial of said boss, a screw threaded in the boss and extending through the sleeve and means on said screw cooperating with the sleeve for varying the resistance to manual rotation of the screw at predetermined amounts of rotation.

2. A mounting for telescope sights comprising a frame, a boss on said frame having an axially directed groove, a sleeve telescoped over said boss and having a lug received in said groove, a screw threaded in said boss and extending through the sleeve, means for holding said sleeve and screw against relative axial movement but permitting relative rotational movement and means on said screw cooperating with said sleeve to vary the resistance to manual rotation of the screw at predetermined amounts of rotation.

3. A mounting for telescope sights comprising a frame, a boss on said frame, a screw threaded in said boss and extending outwardly therefrom, a sleeve fitting the screw at one end and counterbored at the other end to be telescoped over the boss, means for limiting the sleeve to axial movement on the boss, a thimble secured on the end of said screw, said thimble being counterbored to be telescoped over said sleeve, a click spring mounted on said screw between the sleeve and thimble at the bottom of the counterbore in the latter and fixed to rotate therewith, said sleeve on the end adjacent the thimble having a plurality of radial grooves into which a part of the spring is adapted to move to vary the resistance to manual rotation of the screw.

4. A mounting for telescope sights comprising a frame, a boss on said frame, a sleeve telescoped over said boss, means for limiting the movement of the sleeve on the boss to a direction axial of said boss, a screw threaded in said boss and extending through the sleeve, means on said screw for holding the sleeve against movement axially of said screw while permitting relative rotational movement, there being a plurality of radial grooves in an end of said sleeve and a click spring mounted on said screw and rotating therewith, said spring having a rib adapted to enter the grooves to vary the resistance to manual rotation of the screw at predetermined amounts of rotation.

5. A mounting for telescope sights comprising a frame, a boss on said frame, a screw having one end threaded in said boss, a thimble secured on the other end of said screw and adapted to rotate therewith, a sleeve telescopically mounted on said boss and extending into said thimble, means for preventing rotational movement of the sleeve on the boss and means cooperating with said sleeve and thimble to vary the resistance to manual rotation of the screw at predetermined amounts of rotation thereof.

6. A mounting for telescope sights comprising a frame, an adjusting screw mounted in the frame, said screw having a shoulder between the ends thereof, a thimble mounted on one end of the screw, said thimble being counterbored to be telescoped over the shoulder, and a click mechanism mounted within the thimble between the shoulder and the bottom of the counterbore.

7. A mounting for telescope sights comprising, a frame, an adjusting screw mounted in the frame, an element mounted on the screw and having a series of recesses, a second element mounted on the screw and having a protrusion adapted to enter the recesses to vary the resistance to manual rotation of the screw at predetermined amounts of rotation, means for restraining one of the elements to rotary movement with respect to the screw and means for restraining the other element against rotary movement with respect to the screw.

8. A mounting for telescope sights comprising a frame, an adjusting screw mounted in the frame, said screw having a shoulder between the ends thereof, a pair of elements mounted on the screw adjacent the shoulder, one of the elements having a series of recesses, and the other element having a protrusion adapted to enter the recesses to vary the resistance to manual rotation of the screw at predetermined amounts of rotation, and means on the screw co-operating with the shoulder for holding said elements in operative engagement.

9. A mounting for telescope sights comprising, a frame, an adjusting screw mounted in the frame, a thimble mounted on the screw at the outer end thereof and having a counterbore open towards the other end of the screw, a click spring mounted entirely within and fixed to rotate with the thimble, and means fixed against rotation with respect to the frame and at least in part within said thimble and cooperating with the spring to vary the resistance to manual rotation of the screw at predetermined amounts of rotation.

10. A mounting for telescope sights comprising a frame, an adjusting screw mounted in the frame, a thimble mounted on one end of the screw and having a counterbore open towards the other end of the screw, means mounted in the counterbore and having a series of recesses, and means mounted in the counterbore adapted to enter the recesses to vary the resistance to manual rotation of the screw at predetermined amounts of rotation, one of said means being fixed to rotate with the screw and the other of said means being held against rotation with said screw.

11. A mounting for telescope sights comprising a frame, an adjusting screw mounted in the frame and extending outwardly therefrom, a thimble mounted on the outer end of the screw and having a counterbore open towards the inner end of the screw, and a pair of elements mounted within the counterbore and cooperating to vary the resistance to manual rotation of the screw at predetermined amounts of rotation, said elements having adjacent faces radially directed with respect to the screw axis, there being a series of indentations in one of the faces and a protrusion on the other face adapted to enter the indentations to effect the resistance to manual rotation, means for fixing one of the elements for rotation with the screw, and means for holding the other element against rotation with the screw.

12. A mounting for telescope sights comprising, a frame, an adjusting screw threaded in the frame and extending outwardly therefrom, a thimble mounted on the outer end of the screw and extending inwardly towards the frame, the thimble being counterbored at its inner end, non-rotatable means extending into the counterbore and terminating therein in a face radially directed with respect to the screw axis, there being a series of circumferentially spaced indentations in the radial face, and means carried by the screw within the counterbore adapted to rotate with the screw and having means to enter the indentations to vary the resistance to manual rotation of the screw at predetermined amounts of rotation.

13. A mounting for telescope sights comprising, a frame, an adjusting screw threaded in the frame and having a stem extending axially outwardly therefrom, a thimble mounted on the outer end of the stem and extending inwardly towards the frame, the thimble at its end adjacent the frame being counterbored, non-rotatable means extending from the frame into the counterbore and terminating therein in a face radially directed with respect to the axis of the screw, there being a series of circumferentially spaced indentations in the radial face, means carried by the stem within the counterbore having a part adapted to enter the indentations to vary the resistance to manual rotation of the screw at predetermined amounts of rotation, and cooperating means on the stem and the second named means to secure positive rotation of the second named means as the screw is rotated by the thimble.

14. A mounting for telescope sights comprising, a frame, an adjusting screw threaded in the frame and extending outwardly therefrom, a thimble mounted on the outer end of the screw and extending inwardly towards the frame, the thimble being counterbored at its inner end, non-rotatable means extending into the counterbore, said non-rotatable means being of circular cross-sectional shape of a diameter to fit the counterbore and terminating within the counterbore in a face radially directed with respect to the screw axis, there being a series of circumferentially spaced indentations in the radial face, and means carried by the screw and rotating therewith within the counterbore having a part adapted to enter the indentations to vary the resistance to manual rotation of the screw at predetermined amounts of rotation.

FREDERICK A. KUHN.